United States Patent
Bessette (12)

(10) Patent No.: US 6,260,648 B1
(45) Date of Patent: Jul. 17, 2001

(54) SYSTEM FOR LINKING A STEERING ROD TO A STEERING GEAR IN A STEERABLE VEHICLE OR A SNOWMOBILE

(75) Inventor: Robert Bessette, Saint-Jean-sur-Richelieu (CA)

(73) Assignee: Robert Bessette Technologie Inc., Quebec (CA)

(*) Notice: Subject to any disclaimer, the term of this patent is extended or adjusted under 35 U.S.C. 154(b) by 0 days.

(21) Appl. No.: 09/500,798

(22) Filed: Feb. 10, 2000

(30) Foreign Application Priority Data

Feb. 10, 1999 (CA) .................................................. 2260319

(51) Int. Cl.$^7$ ........................... B62B 19/00; B62B 17/00; B62K 21/16
(52) U.S. Cl. ........................... 180/184; 280/16; 280/21.1; 74/551.3
(58) Field of Search ................................... 180/184, 190; 74/551.3, 551.4; 280/16, 21.1

(56) References Cited

U.S. PATENT DOCUMENTS

| | | | |
|---|---|---|---|
| 2,702,088 | 2/1955 | Klimek, Jr. | 180/5 |
| 3,140,752 | 7/1964 | Feu | 180/5 |
| 3,464,510 | 9/1969 | Washizawa et al. | 180/5 |
| 3,530,950 | 9/1970 | Lamb | 180/5 |
| 3,550,706 | 12/1970 | Watkins | 180/5 |
| 3,550,707 | 12/1970 | Lange | 180/5 |
| 3,583,507 | 6/1971 | Trautwein | 180/5 |
| 3,608,658 | 9/1971 | Woodfill | 180/5 R |
| 3,650,341 | 3/1972 | Asmussen | 180/5 R |
| 3,692,130 | 9/1972 | Stacy, Jr. | 180/5 R |
| 3,731,755 | 5/1973 | Drekzka | 180/5 R |
| 3,739,867 | 6/1973 | Drawe | 180/5 R |
| 3,760,895 | 9/1973 | Martinmaas | 180/5 R |
| 3,777,830 | 12/1973 | Christensen et al. | 180/5 R |
| 3,815,696 | 6/1974 | Larive et al. | 180/5 R |
| 3,827,516 | 8/1974 | Lucia | 180/5 R |
| 3,847,239 | 11/1974 | Copeland | 180/5 R |
| 3,877,533 | 4/1975 | Maziarka et al. | 180/5 R |
| 3,930,547 | 1/1976 | West | 180/5 R |

(List continued on next page.)

FOREIGN PATENT DOCUMENTS

| | | |
|---|---|---|
| 942359 | 2/1974 | (CA) . |
| 971208 | 7/1975 | (CA) . |
| 972783 | 8/1975 | (CA) . |
| 973240 | 8/1975 | (CA) . |
| 975658 | 10/1975 | (CA) . |
| 994839 | 8/1976 | (CA) . |
| 1012189 | 6/1977 | (CA) . |
| 1123479 | 5/1982 | (CA) . |
| 1174258 | 9/1984 | (CA) . |
| 1231123 | 1/1988 | (CA) . |
| 1332623 | 10/1994 | (CA) . |
| 2168905 | 8/1996 | (CA) . |
| 2168269 | 7/1997 | (CA) . |

*Primary Examiner*—Brian L. Johnson
*Assistant Examiner*—Matthew Luby
(74) *Attorney, Agent, or Firm*—McDermott, Will & Emery

(57) ABSTRACT

A linking system for linking a steering rod to a steering gear in a steerable vehicle. In particular, the steerable vehicle is a snowmobile having a frame, a pair of skis pivotally mounted on the frame, a handlebar rotatably mounted onto the frame, and a linking system for linking the handlebar to the skis for steering the snowmobile. The linking system comprises a drive sprocket mounted for common rotation with the steering rod. It also comprises a chain having a first end and a second end. The chain is trained about the drive sprocket. A pair of driven sprockets redirect the first and second ends of the chain. The chain is trained about the pair of driven sprockets. The system further comprises a sliding rod having a middle portion connected to the first and second ends of the chain, and a pair of end portions connected to the steering gear of the steerable vehicle.

10 Claims, 8 Drawing Sheets

U.S. PATENT DOCUMENTS

| | | | |
|---|---|---|---|
| 3,931,862 | 1/1976 | Cote | 180/5 R |
| 3,967,692 | 7/1976 | Hoffman | 180/5 R |
| 3,972,538 | 8/1976 | Breame | 280/93 |
| 3,977,485 | 8/1976 | West et al. | 180/5 R |
| 3,977,693 | 8/1976 | Gamaunt | 280/91 |
| 3,982,597 | 9/1976 | Callaway | 180/5 R |
| 4,034,820 | 7/1977 | Barnhardt | 180/5 R |
| 4,082,155 | 4/1978 | McCartney | 180/5 R |
| 4,095,250 | 6/1978 | Giglioli | 354/293 |
| 4,143,729 | 3/1979 | West et al. | 180/5 R |
| 4,158,901 | 6/1979 | Wulff et al. | 15/401 |
| 4,248,444 | 2/1981 | Johnson | 280/47.11 |
| 4,252,354 | 2/1981 | Lob | 280/21 R |
| 4,299,407 | 11/1981 | Simson | 280/775 |
| 4,319,656 | 3/1982 | Kobayashi | 180/182 |
| 4,328,878 | 5/1982 | Yoshida | 180/182 |
| 4,337,958 | 7/1982 | Witt et al. | 280/16 |
| 4,352,501 | 10/1982 | Takagi | 280/16 |
| 4,364,447 | 12/1982 | Yoshida | 180/182 |
| 4,367,881 | 1/1983 | Williams | 280/96 |
| 4,375,293 | 3/1983 | Solbes | 280/21 A |
| 4,422,657 | 12/1983 | Swanson | 280/21 R |
| 4,424,979 | 1/1984 | Takagi | 280/21 R |
| 4,504,074 | 3/1985 | Smith | 280/93 |
| 4,544,170 | 10/1985 | Ebert et al. | 280/21 R |
| 4,591,173 | 5/1986 | Marier | 280/21 R |
| 4,633,964 | 1/1987 | Boyer et al. | 180/190 |
| 4,637,481 | 1/1987 | Shoemaker | 177/50 |
| 4,671,521 | 6/1987 | Talbot et al. | 280/16 |
| 4,768,794 | 9/1988 | Bibollet | 280/21 R |
| 4,776,604 | 10/1988 | Valdez et al. | 280/87.04 R |
| 4,826,184 | 5/1989 | Kuehmichel et al. | 280/21.1 |
| 5,029,664 | 7/1991 | Zulawski | 180/190 |
| 5,054,798 | 10/1991 | Zulawski | 280/16 |
| 5,064,208 | 11/1991 | Bibollet | 280/21.1 |
| 5,251,715 | 10/1993 | Riu | 180/79.1 |
| 5,855,386 | 1/1999 | Atkins | 280/124.111 |
| 6,009,966 | 1/2000 | Olson et al. | 180/182 |

SYSTEM FOR LINKING A STEERING ROD TO A STEERING GEAR IN A STEERABLE VEHICLE OR A SNOWMOBILE

FIELD OF THE INVENTION

The present invention relates to a linking system for linking a steering rod to a steering gear in a steerable vehicle, particularly a snowmobile.

BACKGROUND

The following documents are directed to various mechanisms using rigid tie rods and levers in snowmobiles:

| | |
|---|---|
| US-5,054,798 | US-3,731,755 |
| US-4,826,184 | US-3,608,658 |
| US-4,768,794 | US-3,550,707 |
| US-4,591,173 | US-3,550,706 |
| US-4,364,447 | US-3,530,950 |
| US-4,319,656 | US-3,464,510 |
| US-3,877,533 | CA-2,168,269 |
| US-3,847,239 | CA-994,839 |
| US-3,827,516 | CA-975,658 |
| US-3,777,830 | CA-971,208 |
| US-3,760,895 | CA-942,359. |

The following documents are directed to suspensions and suspension elements in snowmobiles:

| | |
|---|---|
| US-6,009,966 | US-4,337,958 |
| US-5,064,208 | US-4,328,878 |
| US-5,029,664 | US-4,252,354 |
| US-4,671,521 | US-4,143,729 |
| US-4,633,964 | US-4,082,155 |
| US-4,544,170 | US-4,034,820 |
| US-4,424,979 | US-3,982,597 |
| US-4,422,657 | US-3,977,485 |
| US-4,375,293 | US-3,967,692 |
| US-4,352,501 | US-3,931,862 |
| US-3,930,547 | CA-2,168,905 |
| US-3,815,696 | CA-1,332,623 |
| US-3,692,130 | CA-1,231,123 |
| US-3,853,507 | CA-1,174,258 |
| US-3,739,867 | CA-1,123,479 |
| US-3,650,341 | CA-1,012,189 |
| US-3,140,752 | CA-973,240 |
| US-2,702,088 | CA-972,783. |

The following documents are directed to steering mechanisms using sprocket wheels and chains for vehicles other than snowmobiles:

| | |
|---|---|
| US-5,855,386 | US-4,299,407 |
| US-5,251,715 | US-4,248,444 |
| US-4,776,604 | US-4,158,901 |
| US-4,637,481 | US-4,095,250 |
| US-4,504,074 | US-3,977,693 |
| US-4,367,881 | US-3,972,538. |

Snowmobiles known in the prior art have steering mechanisms using rigid tie rods to control the skis. The main problem of using rigid tie rods is that it clutters the front part of the snowmobile and makes it difficult to mount a motor therein. Also, in the case where the legs of a driver are forwardly positioned under a steering rod, using rigid tie rods would interfere with leg clearance. Furthermore, in the case of a low positioned steering wheel which is close to the skis, it is mechanically difficult to connect the steering wheel to the skis by means of tie rods.

SUMMARY

An object of the present invention is to provide a linking system for linking a steering rod to a steering gear in a steerable vehicle. The linking system comprises a drive sprocket mounted for common rotation with the steering rod. It also comprises a chain having a first end and a second end. The chain is trained about the drive sprocket. A pair of driven sprockets redirect the first and second ends of the chain. The chain is trained about the pair of driven sprockets.

The system further comprises a sliding rod having a middle portion connected to the first and second ends of the chain, and a pair of end portions connected to the steering gear of the steerable vehicle which, in practice, can be of any type even though the invention is more specifically directed for use in snowmobiles.

Thus, another objet of the present invention is to provide snowmobile having a frame, a pair of skis pivotally mounted on the frame, a handlebar rotatably mounted onto the frame, and a linking system for linking the handlebar to the skis for steering the snowmobile. The linking system of the snowmobile comprises a steering rod mounted for common rotation with the handlebar. It also comprises a drive sprocket mounted for common rotation with the steering rod and a chain having a first end and a second end. The chain is trained about the drive sprocket. A pair of driven sprockets redirect the first and second ends of the chain. The chain is trained about the pair of driven sprockets. The system further comprises a sliding rod slidably mounted on the frame. The sliding rod has a middle portion connected to the first and second ends of the chain and a pair of end portions each connected to pivotally mounted tie rods attached to the skis. In use, the sliding rod slides and pivots the tie rods in response to rotation of the steering rod, and the skis are pivoted in response to a pivoting of the tie rods.

BRIEF DESCRIPTION OF THE DRAWINGS

The invention as well as its numerous advantages will be better understood by the following non-restrictive description of preferred embodiments made in reference to the appended drawings in which.

DETAILED DESCRIPTION OF THE INVENTION

Figure 1:
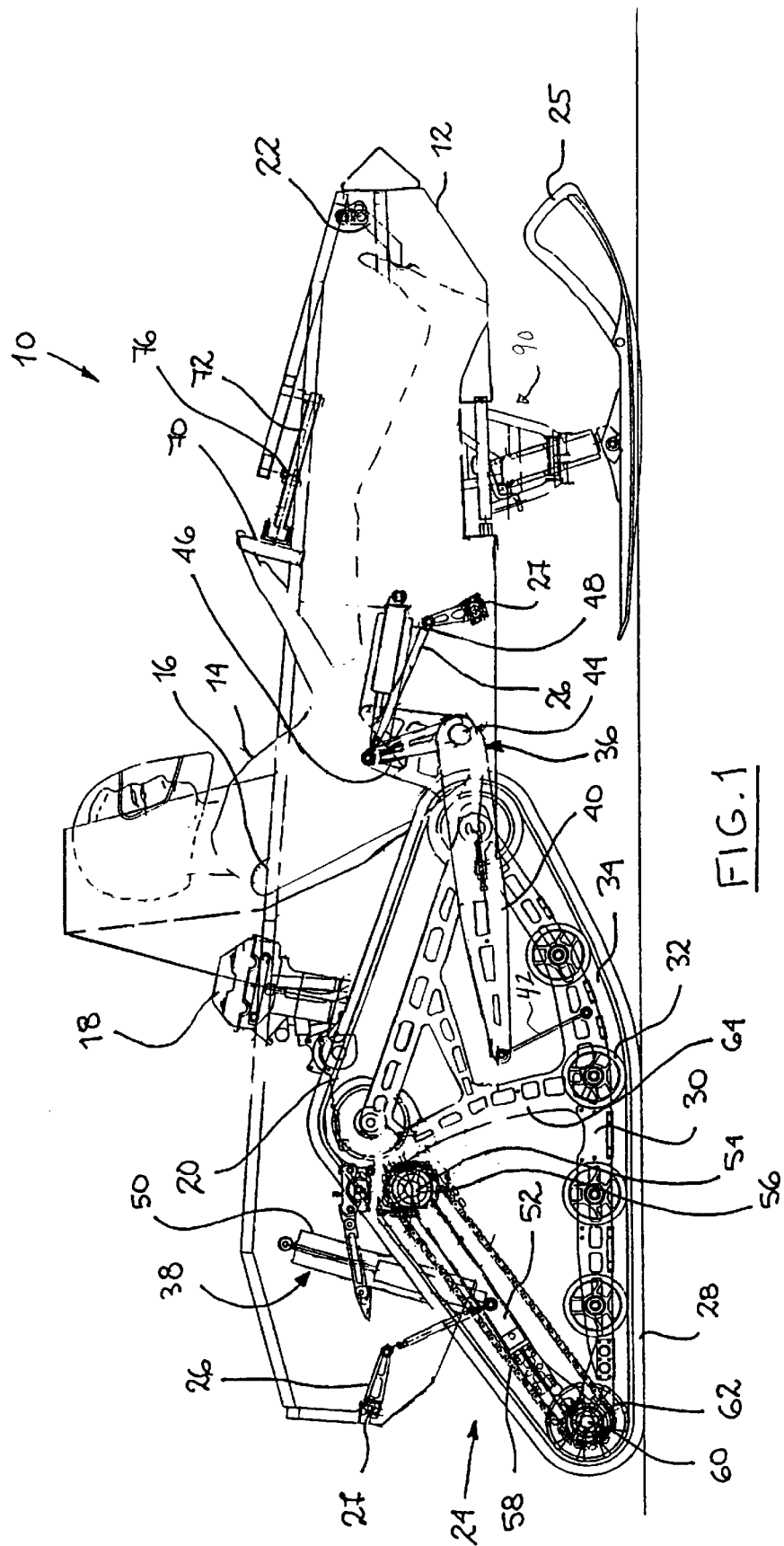
FIG. 1 is a side view of a snowmobile including a linking system according to the present invention.

Referring to FIGS. 1 to 6, there is shown a linking system 71 for linking a steering rod 72 to a steering gear 90 in a steerable vehicle 10. The linking system 71 comprises a drive sprocket 76 mounted for common rotation with the steering rod 72. The linking system 71 also comprises a chain 78 having a first end 92 and a second end 94. The chain 78 is trained about the drive sprocket 76. The linking system 71 also comprises a pair of driven sprockets 84 for redirecting the first and second ends 92, 94 of the chain 78. The chain 78 is also trained about the pair of driven sprockets 84. The linking system also comprises a sliding rod 86 having a middle portion 96 connected to the first and second ends 92, 94 of the chain 78, and a pair of end portions 98 connected to the steering gear 90 of the steerable vehicle 10.

Figure 2:
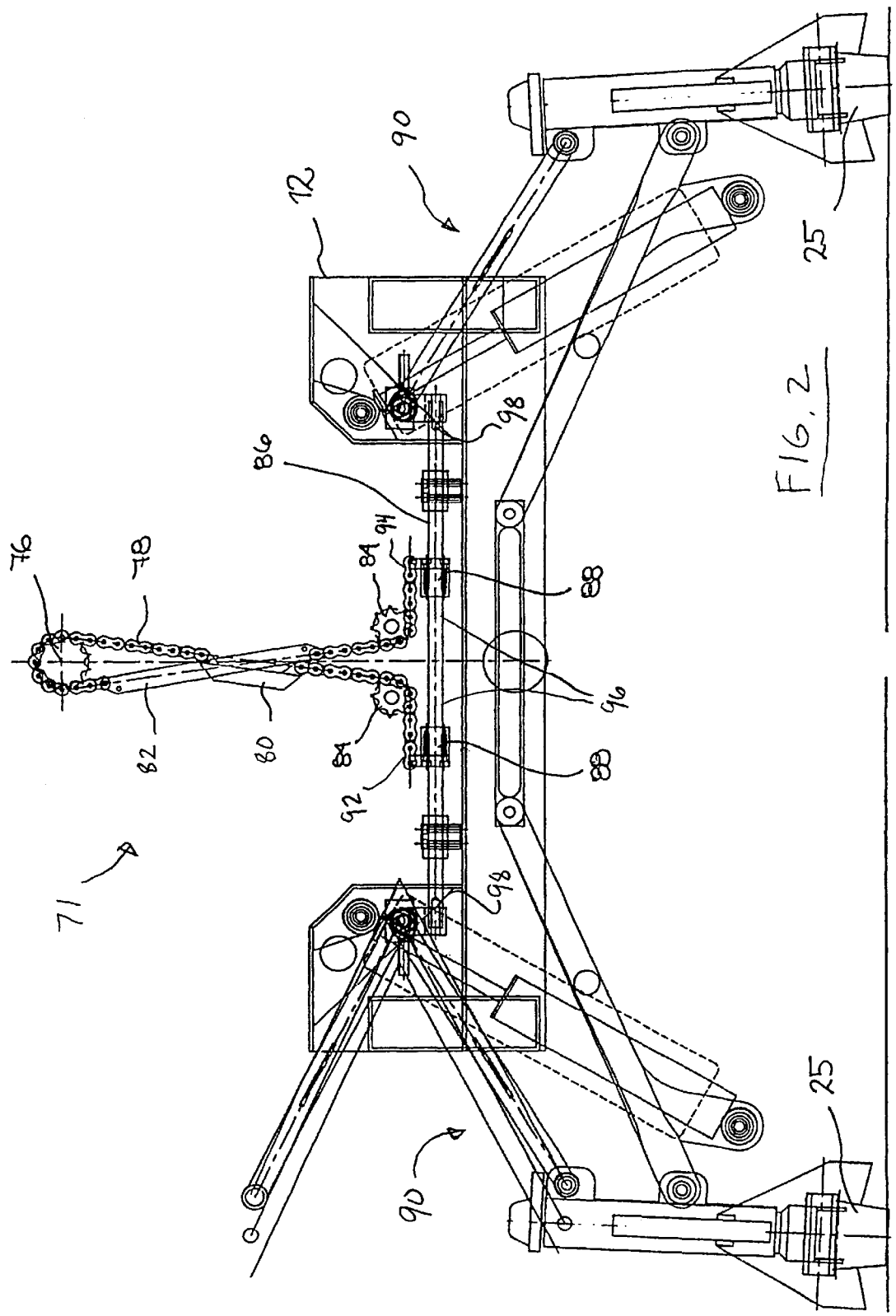
FIG. 2 is a front view of the linking system shown in FIG. 1.
Figure 3:
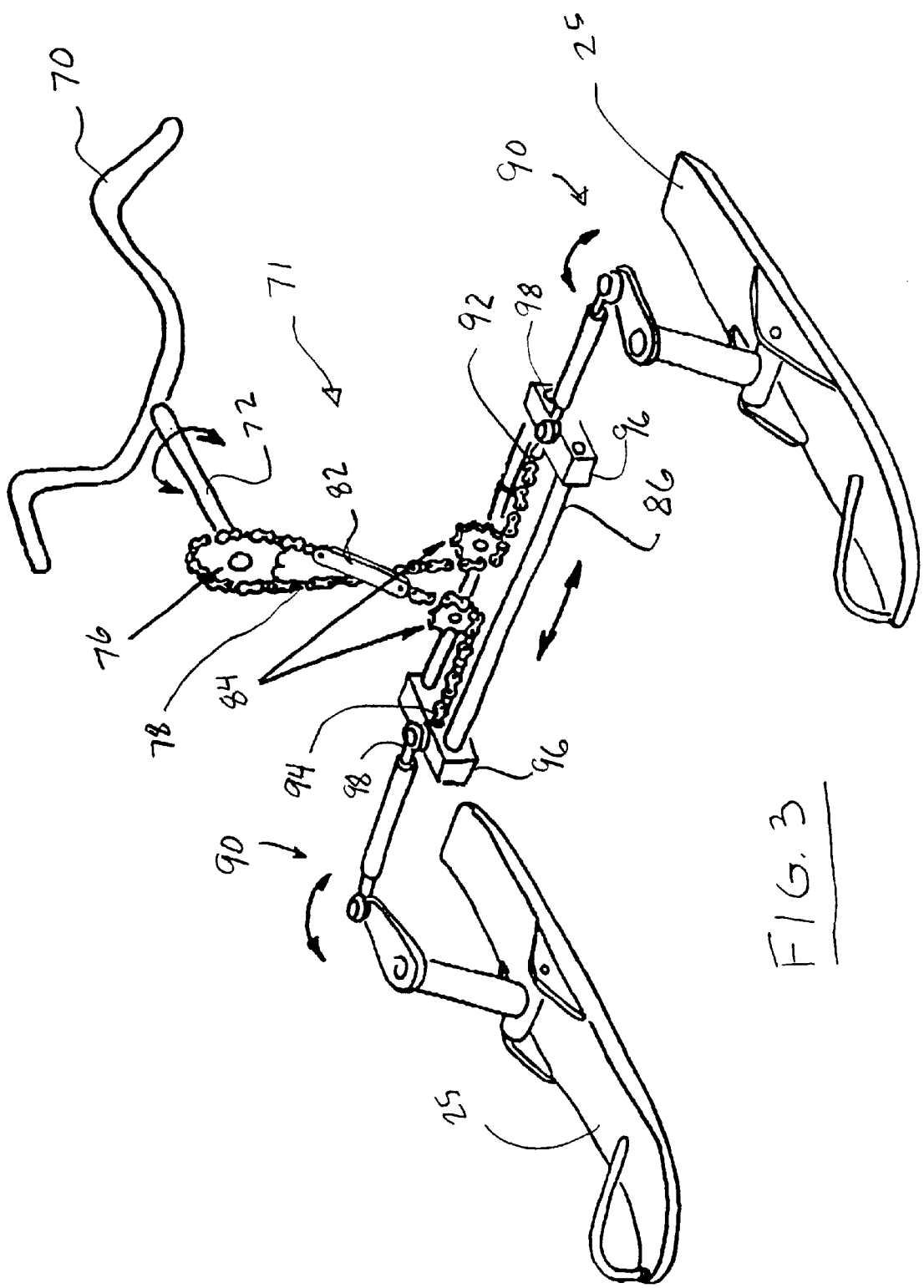
FIG. 3 is a perspective view of the linking system in a snowmobile having a handlebar and skis.
Figure 4:
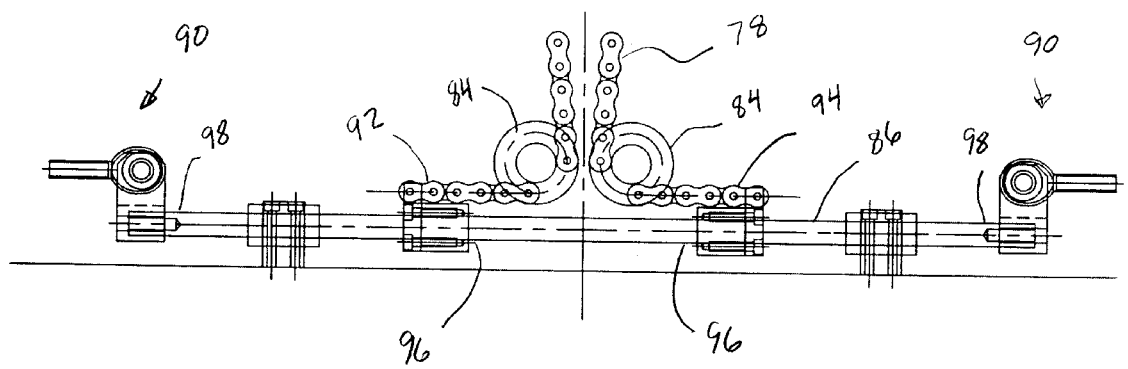
FIG. 4 is a partial front view of the linking system shown in FIG. 2.
Figure 5:
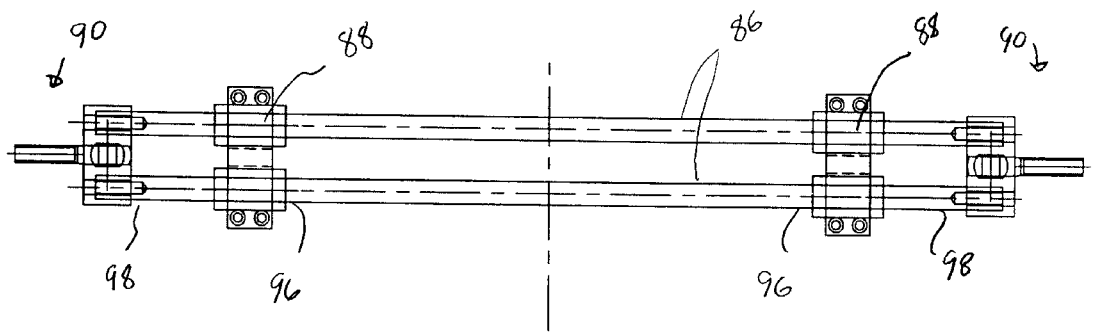
FIG. 5 is a partial top view of the linking system shown in FIG. 2.
Figure 6:
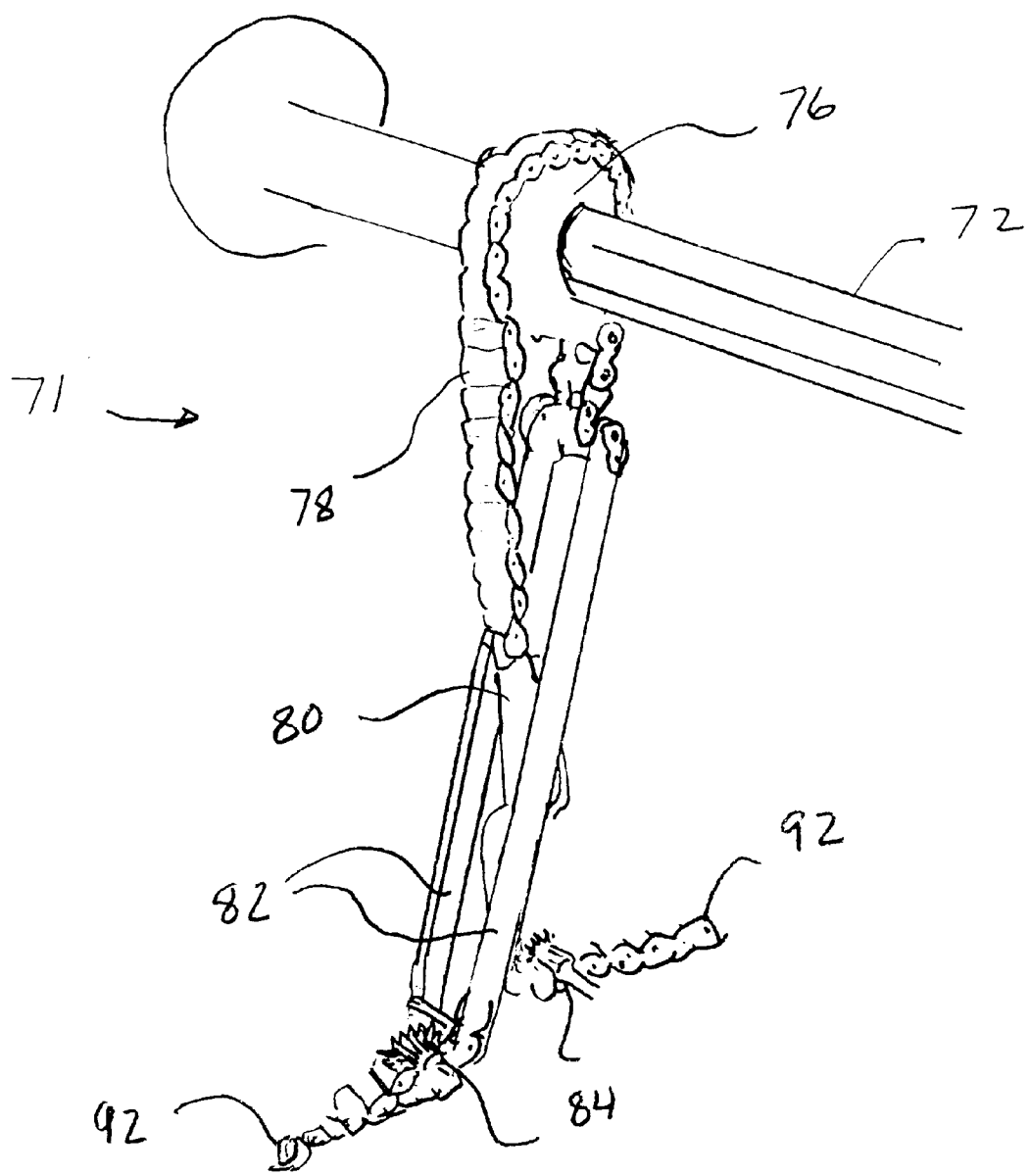
FIG. 6 is a perspective view of the linking system according to the present invention.
Figure 7:
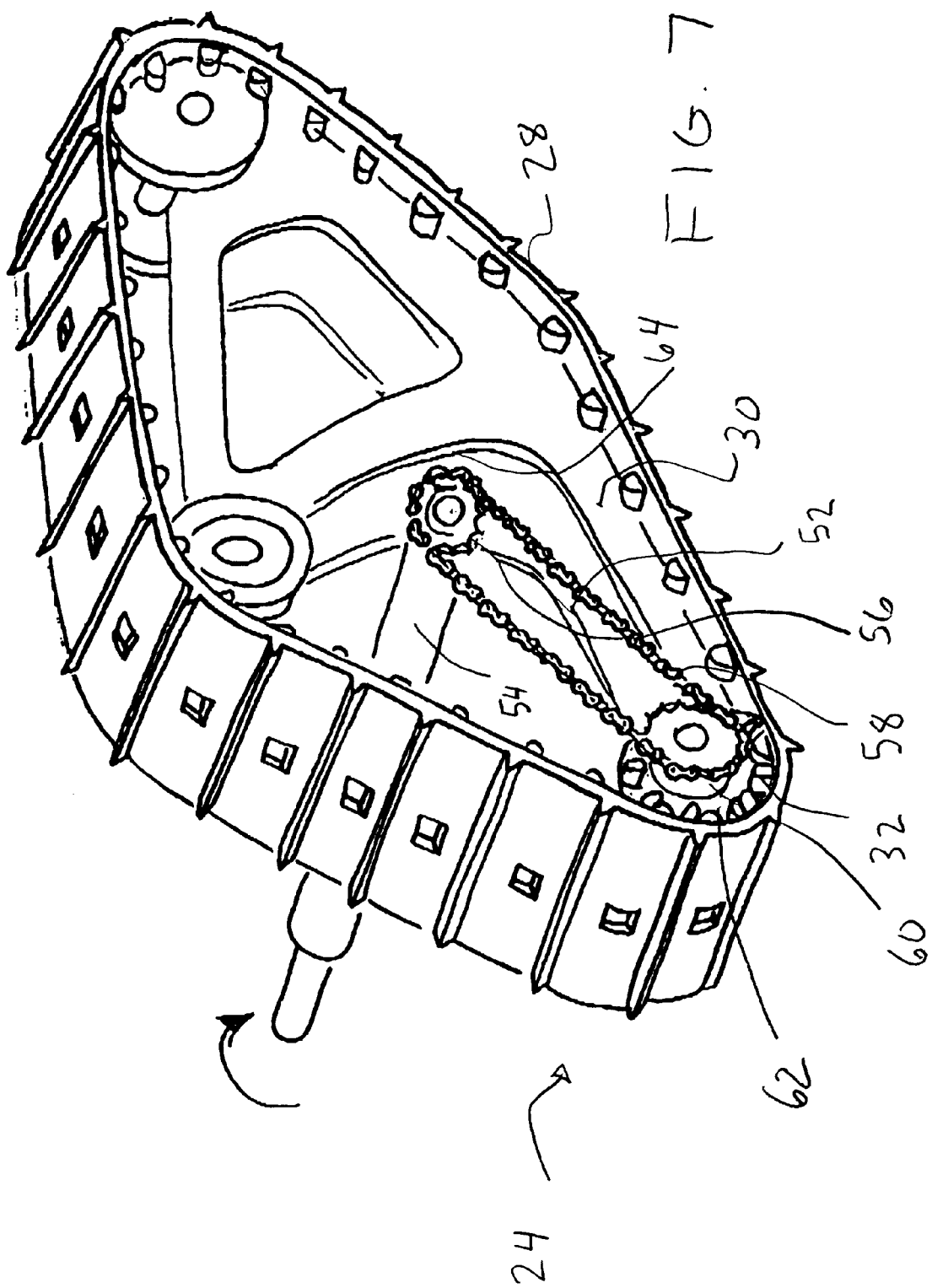
FIG. 7 is a perspective view of a lateral track shown in FIG. 1.
Figure 8:
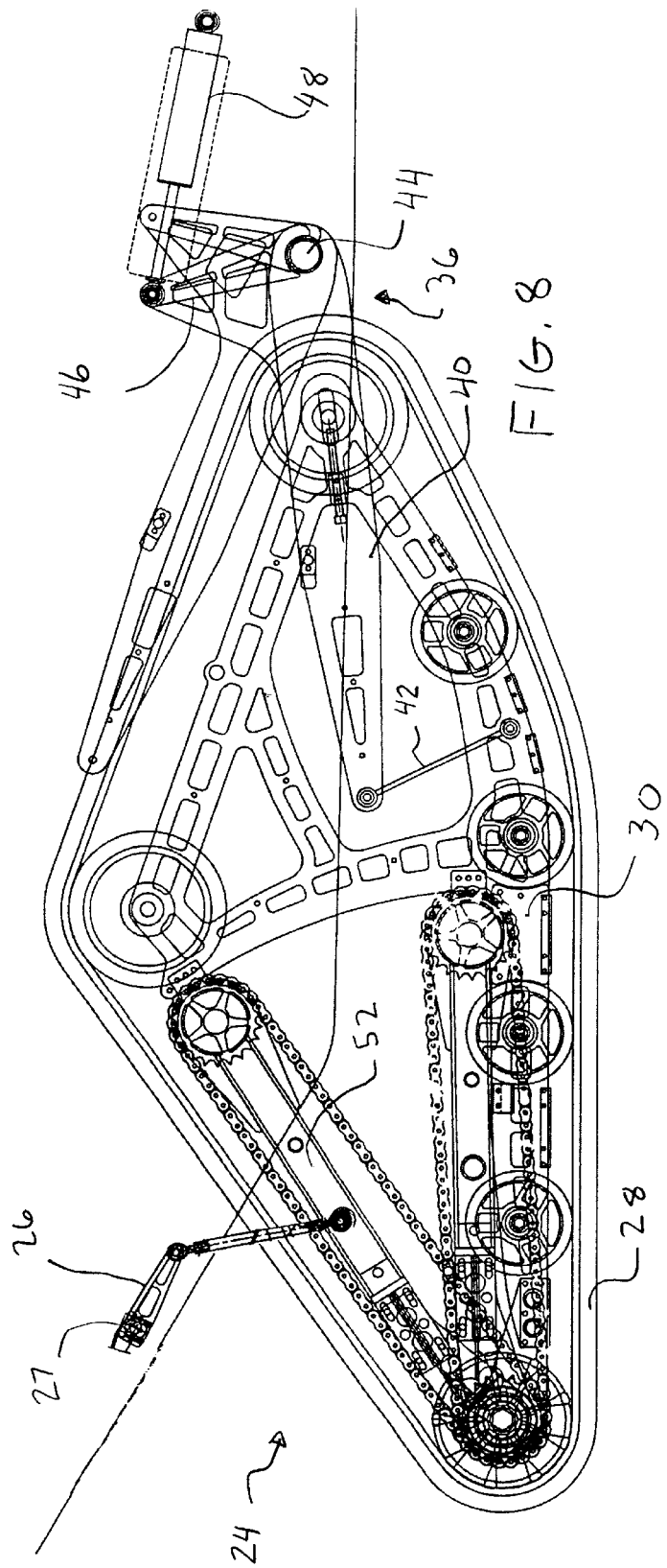
FIG. 8 is a side view of the lateral track shown in FIG. 1.
Figure 9:
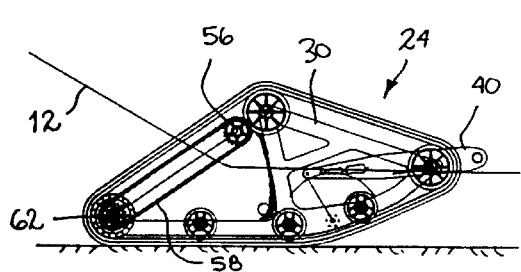
FIGS. 9 to 12 are side schematic views of the track of FIG. 1.
Figure 10:
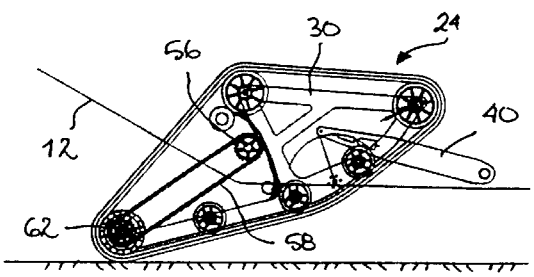
Figure 11:
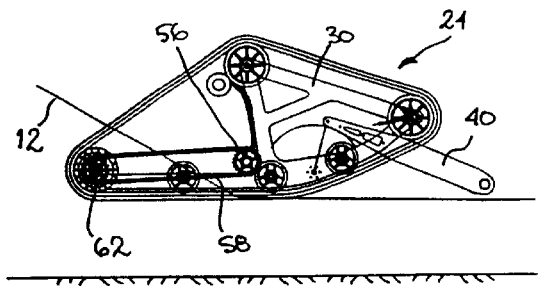
Figure 12:
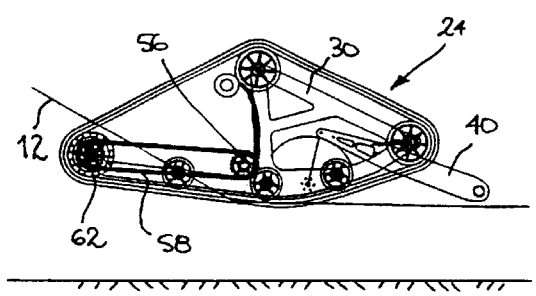

As shown in FIGS. 2 to 4, the sliding rod 86 and the first and second ends 92, 94 of the chain 78 are connected by means of connectors 88. As shown in FIG. 5, the sliding rod 86 may be embodied by a pair of parallel sliding rods 86.

Referring back again to FIGS. 1 to 6, there is shown the steerable vehicle 10 or snowmobile 10 having a frame 12, a pair of skis 25 pivotally mounted on the frame 12, a handlebar 70 rotatably mounted onto the frame 12, and a linking system 71 for linking the handlebar 70 to the skis 25 for steering the snowmobile 10. The linking system 71 comprises a steering rod 72 mounted for common rotation with the handlebar 70 and a drive sprocket 76 mounted for common rotation with the steering rod 72. As it would be apparent to one skilled in the art, the handlebar 70 may be a steering wheel or any suitable means for rotating the steering rod 72. The linking system 71 also comprises a chain 78 having a first end 92 and a second end 94. The chain 78 is trained about the drive sprocket 76. The linking system 71 also comprises a pair of driven sprockets 84 for redirecting the first and second ends 92, 94 of the chain 78. The chain 78 is trained about the pair of driven sprockets 84. The linking system also comprises a sliding rod 86 slidably mounted on the frame 12. The sliding rod 86 has a middle portion 96 connected to the first and second ends 92, 94 of the chain 78 and a pair of end portions 98 each connected to pivotally mounted tie rods 90 attached to the skis 25. In use, the sliding rod 86 slides and pivots the tie rods 90 in response to rotation of the steering rod 72, and the skis 25 are pivoted in response to a pivoting of the tie rods 90.

Preferably, in the linking system 71, the chain 78 is crisscrossed and further comprises a sliding mechanism 80, 82. The chain 78 is crisscrossed because the left-right movement in some cases needs to be inverted when transmitting it to the steering gear 90.

Preferably, in the linking system 71, the sliding mechanism 80, 82 comprises an inner link 80 forming a portion of the chain 78 on one side thereof between the drive sprocket 76 and one of the driven sprockets 84. The sliding mechanism also comprises two parallel, spaced apart outer links 82 forming another portion of the chain 78 on a second side thereof between the drive sprocket 76 and another one of the driven sprockets 84. The inner link 80 extends between the two parallel, spaced apart outer links 82.

Referring once again to FIG. 1, there is shown the steerable vehicle or snowmobile 10 having the frame 12 and a seat 16. A driver 14 is shown sitting within the snowmobile 10 similarly as he would in a race car, his legs being forwardly positioned. A five-point seat belt holds the driver 14 onto his seat 16 in the snowmobile 10.

The rear part of the frame 12 is adapted to receive a motor 18 and its transmission 20. The motor 18 is transversally mounted and is preferably a four-stroke engine, which is coupled to a multiple manual speed transmission. The accelerator, the brake and the clutch are activated by the driver 14 by means of pedals 22.

Referring to FIGS. 1, and 7 to 12, the snowmobile 10 comprises two lateral tracks 24 connected to the rear part of the snowmobile 10 by means of suspensions. The tracks 24 are located outside the frame 12. Each track 24 is preferably aligned with a corresponding ski 25. Both tracks 24 are connected together by two junction mechanisms 26, one located at the front and the other towards the back of the tracks 24, in order to ensure a relatively similar displacement thereof. For example, when the left track is lifted up as it goes over an obstacle, the right track follows a similar movement. This type of junction mechanism 26 mounted between the two lateral tracks 24 is more appropriate for a light vehicle. Preferably, each junction mechanism 26 comprises a set of articulated levers, which are connected to a torsion bar 27 extending across the frame 12 of the snowmobile 10.

A belt 28 is mounted on each track 24 around a rigid frame 30. This frame 30 may also be flexible, but experimental test have shown very good performances with the rigid frame 30. The rigid frame 30 may also be used in a snowmobile having a single track or having tracks positioned in a different manner as the one shown in FIG. 1. By using the rigid frame 30, support wheels 32 and lower members 34 remain at a constant distance with respect to each other.

Suspensions are positioned outside the rigid frame 30. With such a configuration, the tension of the belt 28 remains constant or tends to be uniform when the vehicle 10 is used as opposed to conventional snowmobiles wherein tension fluctuates as a function of the deflection of the suspension.

Preferably, two suspensions are provided on each track 24, that is, a front suspension 36 and a rear suspension 38. Each front suspension 36 comprises a pair of principal lever arms 40 which are substantially parallel with respect to each other and are articulately connected to the frame 30 of the track 24 by means of a second lever arm 42. The front ends of the principal lever arms 40 are connected to a common pivot 44 extending sideward from the frame 12 of the vehicle 10. A third lever arm 46 is orthogonally connected to the front ends of the principal lever arms 40. A shock absorber 48 is mounted between the opposite end of the third arm lever 46 and a pivot point on the side of the frame 12.

The rear suspension 38 comprises a shock absorber 50 articulately mounted between the rigid frame 30 and a rigid holding arm 52 as later described. The shock absorber 50 may also be directly connected to the rigid frame 30 depending on the suspension design.

In known snowmobiles, the transmission of force is transmitted to the front part of the track. In the present embodiment, the transmission is done at the back of the track. In order to achieve the transmission of the force with a rigid frame 30, a link is provided between the transmission output 20 and the belt 28 of the track 24, regardless of the position of the rigid frame 30.

The vehicle 10 is provided with an output shaft 54 corresponding to the transmission output 20. The output shaft 54 has two opposite ends protruding from each side of the frame 12. Each end comprises a sprocket wheel 56 onto which is wound a chain 58. Each chain 58 extends to the most rearward wheels 32 of the corresponding track 24 which are in contact with the belt 28. The wheels 32 are mounted on a hub 60 and an extremity of the hub 60 receives a sprocket wheel 62 around which is wound the other end of the corresponding chain 58. These elements are located in a space within the inside of the rigid frame 30. Alternatively, the chains 58 and sprocket wheels 56, 62 may be replaced by belts and pulleys.

Because the output shaft 54 is in a fixed position on the frame 12, the relative movement between the wheels 32 that transmit the traction force and the output shaft 54 must be circular in order to keep a constant distance between the two opposite sprocket wheels 56, 62 of the same side. This is achieved by the rigid holding arm 52 mounted between an end of the output shaft 54 and the corresponding rear wheels 32. Each holding arm 52 is pivotally connected to one of the ends of the output shaft 54. The opposite end is also pivotally connected to the hub 60.

Preferably, each rear shock absorber 50 is connected to a corresponding holding arm 5:2. Furthermore, the rigid frame 30 comprises a curved portion 64 located next to the front of the output shaft 54 in order to follow the geometry of the movement of the rigid frame 30. Small cushions are placed between the front end of each holding arm 52 and the curved portion 64 of the rigid frame 30 in order to ensure an ease of movement between the pieces in case they come into contact with each other during use.

FIGS. 9 to 12 schematically illustrate different positions of the rigid frame 30 relative to the frame 12 of the snowmobile 10.

Although the present invention has been explained hereinabove by way of a preferred embodiment thereof, it should be understood that the invention is not limited to this precise embodiment and that various changes and modifications may be effected therein without departing from the scope or spirit of the invention.

What is claimed is:

1. A linking system for linking a steering rod to a steering gear in a steerable vehicle, the linking system comprising:

a drive sprocket mounted for common rotation with the steering rod;

a chain having a first end and a second end, the chain being trained about the drive sprocket;

a pair of driven sprockets for redirecting the first and second ends of the chain, the chain being trained about the pair of driven sprockets; and a sliding rod having a middle portion connected to the first and second ends of the chain, and a pair of end portions connected to the steering gear of the steerable vehicle.

2. The linking system of claim 1, wherein the chain is crisscrossed and further comprises a sliding mechanism.

3. The linking system of claim 2, wherein the sliding mechanism comprises:

an inner link forming a portion of the chain on one side thereof between the drive sprocket and one of the driven sprockets; and two parallel, spaced apart outer links forming another portion of the chain on a second side thereof between the drive sprocket and another one of the driven sprockets, the inner link extends between the two parallel, spaced apart outer links.

4. A snowmobile having a frame, a pair of skis pivotally mounted on the frame, a handlebar rotatably mounted onto the frame, and a linking system for linking the handlebar to the skis for steering the snowmobile, wherein the linking system comprises:

a steering rod mounted for common rotation with the handlebar;

a drive sprocket mounted for common rotation with the steering rod;

a chain having a first end and a second end, the chain being trained about the drive sprocket;

a pair of driven sprockets for redirecting the first and second ends of the chain, the chain being trained about the pair of driven sprockets; and a sliding rod slidably mounted on the frame, the sliding rod having a middle portion connected to the first and second ends of the chain and a pair of end portions each connected to pivotally mounted tie rods attached to the skis; whereby, in use, the sliding rod slides and pivots the tie rods in response to rotation of the steering rod, and the skis are pivoted in response to a pivoting of the tie rods.

5. The linking system of claim 4, wherein the chain is crisscrossed and further comprises a sliding mechanism.

6. The linking system of claim 5, wherein the sliding mechanism comprises:

an inner link forming a portion of the chain on one side thereof between the drive sprocket and one of the driven sprockets; and two parallel, spaced apart outer links forming another portion of the chain on a second side thereof between the drive sprocket and another one of the driven sprockets, the inner link extending between the two parallel, spaced apart outer links.

7. The snowmobile of claim 4, comprising a pair of lateral tracks mounted around a rigid frame.

8. The snowmobile of claim 7, comprising a front suspension and a rear suspension connected between the rigid frame and the frame of the vehicle.

9. The snowmobile of claim 4, wherein a traction force is transmitted to a rear wheel mounted on a track.

10. The snowmobile of claim 7, wherein a traction force is transmitted to rear wheels mounted on said lateral tracks.

* * * * *